United States Patent [19]
Prentice

[11] Patent Number: 4,947,697
[45] Date of Patent: Aug. 14, 1990

[54] SYSTEM FOR MEASURING FORCE VERSUS POSITION OF A FLIGHT CONTROLLER IN AN AIRCRAFT OR FLIGHT SIMULATOR

[75] Inventor: Robert W. Prentice, Montreal, Canada

[73] Assignee: CAE Electronics Ltd., Montreal, Canada

[21] Appl. No.: 372,714

[22] Filed: Jun. 28, 1989

[51] Int. Cl.⁵ .............. G01M 17/06; G01L 5/22
[52] U.S. Cl. .................. 73/865.9; 73/862.05; 73/862.51
[58] Field of Search .............. 73/862.05, 862.04, 379, 73/865.9, 862.51, 866.4

[56] References Cited

U.S. PATENT DOCUMENTS

| | | | |
|---|---|---|---|
| 2,859,621 | 11/1958 | Knopf et al. | 73/865.9 |
| 4,235,103 | 11/1980 | Carter et al. | |
| 4,350,041 | 9/1982 | Loker et al. | |
| 4,358,959 | 11/1982 | Lam et al. | |

OTHER PUBLICATIONS

Report No. UA-00-18 of Fokker-VFW B.V., entitled "Fokker Control Force Measurement Equipment Users Manual", 3/80.

*Primary Examiner*—Charles A. Ruehl
*Attorney, Agent, or Firm*—Foley & Lardner, Schwartz, Jeffery, Schwaab, Mack, Blumenthal & Evans

[57] ABSTRACT

A six-axis force transducer is mounted on the flight controller and provides three independent orthogonal linear force components of the applied force and three independent orthogonal torque components of the applied force. Change in position is measured by a motorized spool connected to a high resolution shaft encoder. A small diameter thread is wound around the spool via a mechanically driven threading device. The free end of the thread is connected to a fixed point in the cockpit. The output of the transducer and the shaft encoder are fed to a microprocessor which calculates net force, in accordance with well known formula, and net position, from calibration data.

5 Claims, 4 Drawing Sheets

FIG. I

SYSTEM FOR MEASURING FORCE VERSUS POSITION OF A FLIGHT CONTROLLER IN AN AIRCRAFT OR FLIGHT SIMULATOR

BACKGROUND OF INVENTION

1. Field of the Invention

The invention relates to a system for measuring the change in position of an aircraft or flight simulator flight controller, with respect to a fixed aircraft or flight simulator reference, resulting from an applied force. More specifically, the invention relates to such a system which incorporates a six-axis force transducer.

2. Description of Prior Art

In order to quantitatively evaluate and/or simulate an aircraft flight control system, force versus position data must be collected throughout the entire excursion authority of all flight controllers of the flight control system. The flight controllers would include, for example, the control column, the aileron wheel, the rudder and toe brake pedals as well as possibly the nosewheel tiller and the throttle levers. This data must be collected under both quasi-static and dynamic conditions. The data must be of an absolute nature giving precise force and position values independent of set-up or operator changes.

One such prior art system for performing the measurements is described in Report No. UA-00-18 of Fokker-VFW B.V., entitled "Fokker Control Force Measurement Equipment Users Manual", and U.S. Pat. No. 4,358,959, Lam et al, Nov. 16, 1982.

The patent teaches a method to measure the parameters of a damped spring supported mass. Included in the patented system is a method of compensation for damping and inertia while performing a measurement so as to reduce the influence of these factors while collecting static data. The system of the patent measures a single force axis which is oriented mechanically as close as possible to a flight controls primary axis. The position sensing employed records a linear position with no calibration or compensation capability.

The system as defined in the Fokker Report suffers from the problems of lack of accuracy, lack of repeatability, operator dependent results, and lack of reliability. These problems result from the following drawbacks:

1. Sensitivity to side loads

A force applied to the load cell in any axis other than the principle axis in the prior art equipment produces a signal which is not representative of the direction or magnitude of the force. The result is a force signal that can be severely corrupted if the operator fails to apply a purely axial force through the load cell.

2. Drift prone position measurement

The position transducer used is actually a velocity transducer, the signal of which is integrated to a position signal. Any offset in the velocity signal or the analog integrator results in a drifting position signal.

3. Linear position measurement

Position signals are strictly straight line positions. This introduces errors when measuring controls which move through an arc (e.g., control column).

4. Analog system

The Fokker system is purely analog making interfacing with digital computers etc. impractical and also requiring frequent re-calibration.

SUMMARY OF INVENTION

It is therefore an object of the invention to provide a system which overcomes the difficulties of the prior art.

It is a further object of the invention to incorporate in the system a six-axis force transducer which records forces and moments in the primary axis to thereby allow the net equivalent force on the flight controller to be evaluated regardless of the method with which the controller is deflected.

It is a still further object of the invention to incorporate in the system a digital position transducer which provides a zero drift, resettable, high resolution digital position signal.

It is a still further object of the invention to provide a microprocessor base such system allowing all data to be recorded, scaled and output under software control to thereby result in a system which will readily interface with other computer devices such as digitized data storage or the simulator host computer itself.

In accordance with the invention, a system for measuring the change in position of an aircraft or flight simulator flight controller, resulting from an applied force, incorporates a six-axis force transducer.

BRIEF DESCRIPTION OF DRAWINGS

The invention will be better understood by an examination of the following description together with the accompanying drawings, in which.

DESCRIPTION OF PREFERRED EMBODIMENTS

Figure 1:
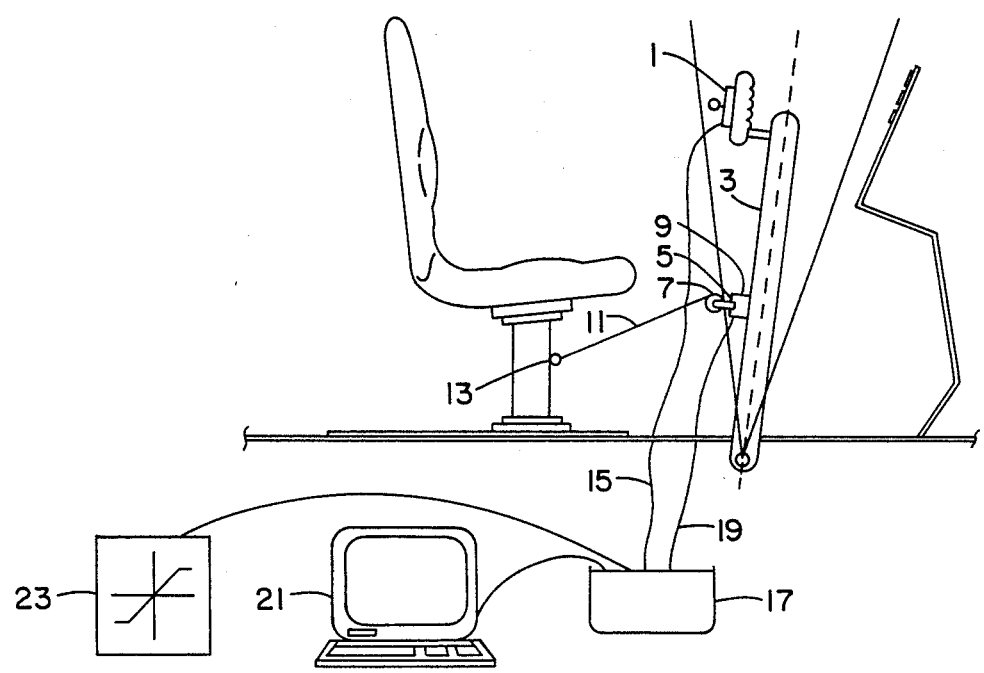
FIG. 1 is a system overview of the measurement equipment.

It is noted that in the drawings, and in the accompanying description, the system is illustrated as measuring force applied to the control column and the change of position of the control column resulting from the applied force. As above-mentioned, the system can be used for measuring force versus change in position of other flight controllers. For this purpose, the measuring system elements do not change. The only thing which changes is the places on which the elements of the system are mounted. In measuring force versus position change of the control column, the elements are mounted on the control column. If force versus position of the rudder were to be measured, then the elements would be mounted on the rudder.

Referring now to FIG. 1, the force transducer 1 is mounted on the control column 3 as is also the position transducer 5. The force transducer 1 can comprise, for example, a JR3 Universal Force Moment Sensor, P/N UFS-4A100-U760, manufactured by JR3 Inc. of Woodland, Calif. The position transducer comprises a motorized spool 7 connected to a high resolution shaft encoder 9. A shaft encoder may comprise a Two and Three Channel Incremental Optical Encoder, P/N HEDS-5310, manufactured by Hewlett Packard of California. A small diameter thread 11 is wound on the spool. The free end of the thread is connected to a fixed point in the cockpit 13.

An output of the force transducer is connected by cable 15 to electronics enclosure 17 which includes, as will be seen below, microprocessor means. The output of the shaft encoder 9 is connected, by cable 19, to the electronics enclosure 17. Terminals are provided in the electronics enclosure for connection to a terminal 21 and an X/Y plotter 23. The force transducer measures forces and moments in three orthogonal axes. The position transducer measures the amount of thread extension throughout the control deflection. The electronics enclosure receives the transducer signals and then performs the appropriate geometry and calibration for the signals. Properly scaled outputs are then provided to the display terminal and the X/Y plotter.

Figure 2:
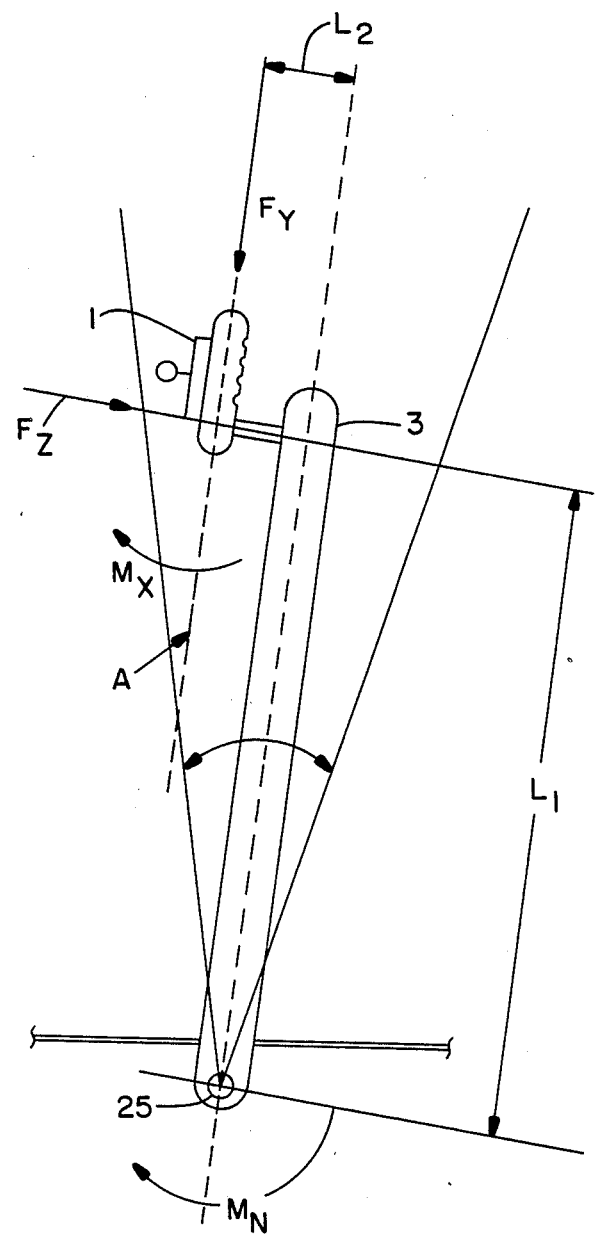
FIG. 2 illustrates the six-axis force geometry employed for a typical pitch control application.

Referring now to FIG. 2, the deflection of any given flight controller, and in this case, the control column, may be accomplished with the application of a force by the pilot along the primary axis or, in the case of the rotational control, through various secondary axes as shown in FIG. 2. In the recording simulation of aircraft flight control systems, the primary concerns are the absolute control position and the net force being applied to the control. Absolute position refers to the position of the flight controller position with respect to fixed aircraft references such as aircraft centerline or the fixed neutral of the controller. The net force is that force required to deflect the control regardless of how that force is applied. For example, the control column 3 can be deflected through the application of a forward and aft tangential force, a vertical force applied at an offset from the column, a torque applied to the wheel about the pitch axis or any combination thereof. To account for all of these possibilities, each significant force component must be measured along with its associated geometry, and a net force about the primary axis (the column pivot point in the case of the control column) must be calculated from this data.

In FIG. 2, the force axis $F_Z$ is the primary axis for deflection of the control column. Deflection may also be accomplished through the application of a vertical force $F_Y$ or by a torque $M_X$ about axis A.

To accurately measure the force characteristics of the control column 3, all of the force components must be measured, and the net torque about the pivot 25 of the control column must be calculated. Taking into account the forces illustrated in FIG. 2, the equations for calculating the net force are as follows:

$$M_N = M_X + F_Z L_1 - F_Y L_2$$

$$F_N = M_N / L_1$$

The force $F_N$ above calculated is the value of the net force applied purely in the Z axis. When secondary effects are ignored, errors of over 15% have been noted.

Equations for calculating net force using three orthogonal linear force elements and three orthogonal torque force elements are well known in the art and require no further description here.

Figure 3:
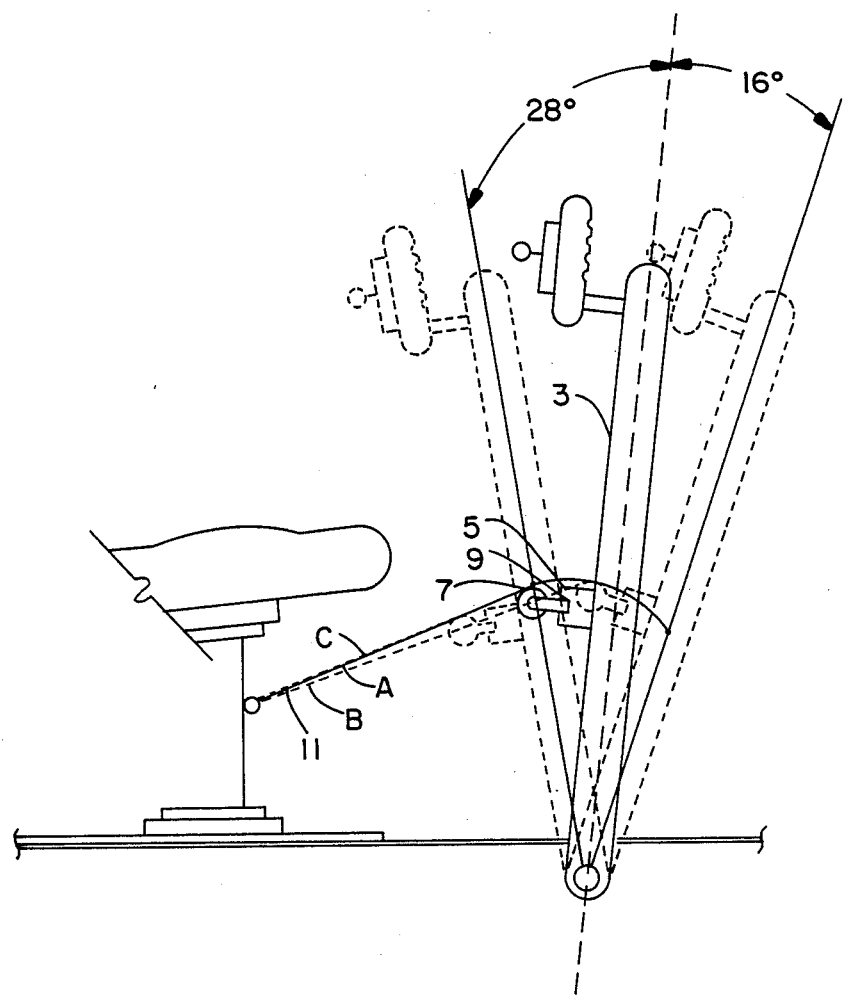
FIG. 3 illustrates the position transducer and calibration.

Turning now to FIG. 3, as above-mentioned, the spool 7 is wound with a small diameter thread 11 via a mechanically driven threading device. The thread position can be determined from the output of the shaft encoder 9. The output of the shaft encoder 9 is decoded in the microprocessor which is in the electronics enclosure 17. FIG. 3 illustrates how to calibrate thread extension versus annular tilt of the control column 3.

Thus, in FIG. 3, when the control column is in its center position (A), the thread extension is 0.69 m. When it is moved forward 16 degrees, the thread extension is 0.89 m, and when it is pivoted backwardly through 28 degrees, the thread extension is 0.53 m. By inputting a sufficient number of points into the processor, which would include software for extrapolation between points, the angular tilt of the control column can be determined by determining the length of thread which is extended.

Figure 4:
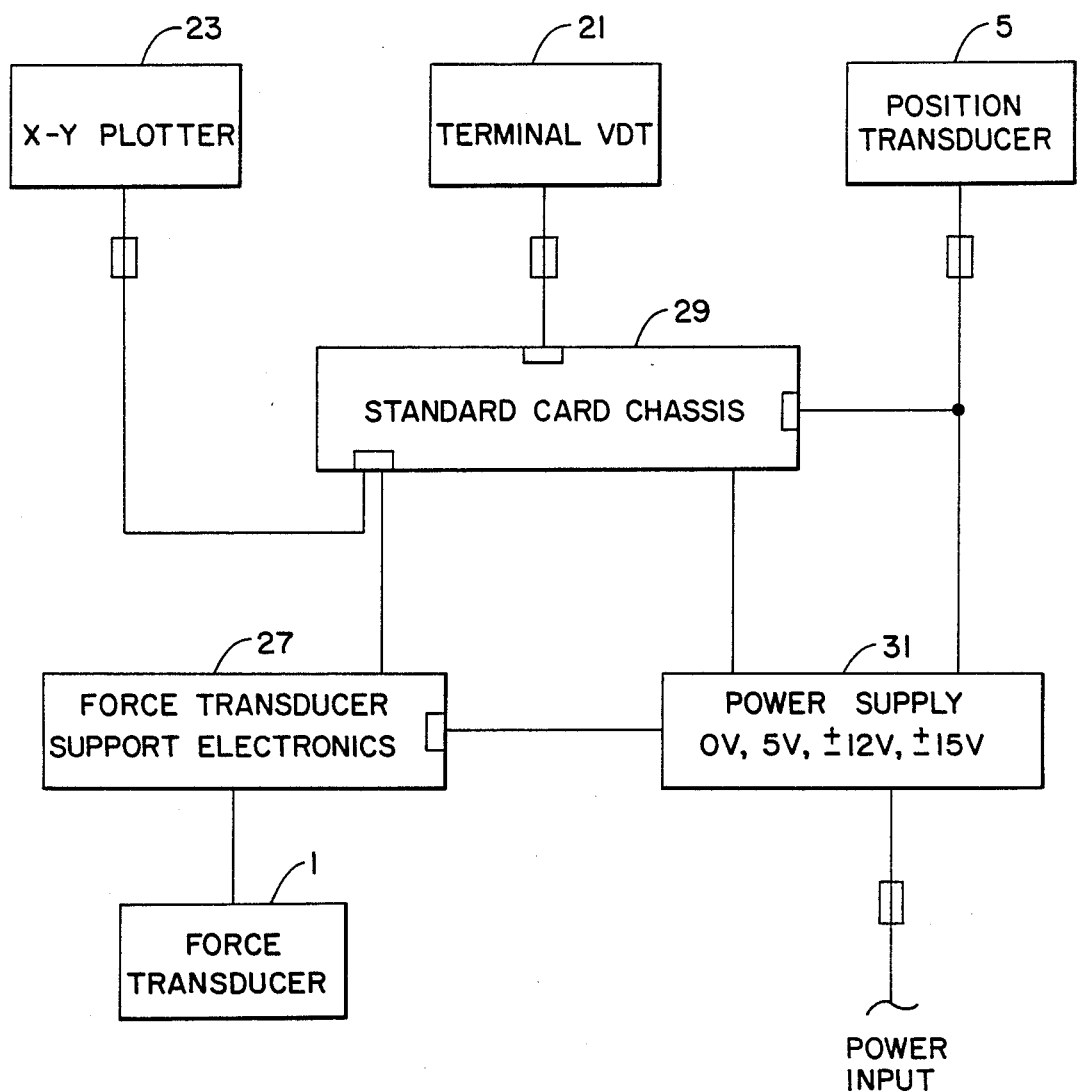
FIG. 4 is a block diagram of the electronics connections.

Turning now to FIG. 4, it can be seen that the force transducer 1 includes support electronics 27. The output of the force transducer is fed to the support electronics, and the output of the support electronics is fed to the processor 29. Output from the position transducer 5 is also fed to the processor 29. The processor 29 performs the required calculations and then provides output to X/Y plotter 23 and terminal 21. The entire system is powered by a power supply 31 which is plugged into a source of 120 volts at 60 Hz.

It can be seen that with the inventive system, all of the components of an applied force are taken into account to improve the accuracy, reliability, and repeatability of the system.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A system for measuring the change in position, resulting from an applied force, of an aircraft or flight simulator flight controller, with respect to a fixed aircraft or flight simulator reference position;
   said system comprising:
   means for measuring said change in position;
   means for measuring said applied force comprising a six-axis force transducer to provide three independent orthogonal linear force components and three independent orthogonal torque components; and
   means for calculating the net applied force resulting from said six measured forces.

2. A system as defined in claim 1 wherein the output of said means for measuring said change in position is connected to said means for calculating, and wherein the output of said means for measuring said applied force is connected to said means for calculating.

3. A system as defined in claim 2 wherein said means for measuring said change and wherein said means for measuring said applied force are both mounted on said flight controller.

4. A system as defined in claim 3 wherein said means for measuring said change comprises a motorized spool connected to a high resolution shaft encoder;
   a small diameter thread being wound on said spool via a mechanically driven threading device.

5. A system as defined in claim 4 wherein the free end of said thread is connected to a fixed point in the cockpit of the aircraft or the flight simulator.

* * * * *